United States Patent [19]

Berghammer et al.

[11] Patent Number: 5,094,491
[45] Date of Patent: Mar. 10, 1992

[54] HYDRAULIC FITTING NUT LOCK

[75] Inventors: Franz I. Berghammer, Huntington Beach; Douglas Pyle, Costa Mesa; Tai H. Do, Huntington Beach; Vahid Zare-Ardestani, Corona; Wilhelm F. Schepergerdes, El Toro; Thomas E. Harbin, Westminster, all of Calif.

[73] Assignee: VSI Corporation, Carson, Calif.

[21] Appl. No.: 589,713

[22] Filed: Sep. 28, 1990

Related U.S. Application Data

[63] Continuation-in-part of Ser. No. 430,317, Oct. 31, 1989, which is a continuation-in-part of Ser. No. 32,700, Apr. 1, 1987, Pat. No. 4,877,271.

[51] Int. Cl.$^5$ ............................................. F16L 55/00
[52] U.S. Cl. ............................................ 285/92; 285/156; 285/158; 285/179; 285/330
[58] Field of Search .................... 285/84, 85, 86, 92, 285/315, 156, 179, 330, 158

[56] References Cited

U.S. PATENT DOCUMENTS

| | | | |
|---|---|---|---|
| 408,320 | 8/1889 | Powell | 285/86 |
| 1,195,165 | 8/1916 | Baker | 411/87 |
| 1,560,694 | 4/1926 | Smith | 285/86 X |
| 1,851,992 | 4/1932 | Smith | 285/86 X |
| 2,208,353 | 7/1940 | Woolley et al. | |
| 2,460,032 | 1/1949 | Risley | |
| 2,497,441 | 2/1950 | Detweiler | |
| 2,565,572 | 8/1951 | Pangborn | 285/316 X |
| 2,728,895 | 12/1955 | Quackenbush et al. | 339/89 |
| 2,971,781 | 2/1961 | Torres | |
| 3,142,498 | 7/1964 | Press | 285/917 |
| 3,207,535 | 9/1965 | Wilson | 285/86 |
| 3,218,025 | 11/1965 | Abelson et al. | 285/86 X |
| 3,223,438 | 12/1965 | De Cenzo | |
| 3,259,162 | 7/1966 | Rosan | 411/109 |
| 3,395,934 | 8/1968 | Rosan et al. | 285/92 |
| 3,404,415 | 10/1968 | Rosan et al. | |
| 3,495,853 | 2/1970 | Furrer | |
| 3,695,644 | 10/1972 | Goldberg | |
| 3,702,707 | 11/1972 | Rosan, Sr. | 285/23 |
| 3,851,901 | 12/1974 | Sills | |
| 3,993,331 | 11/1976 | Schwarz | |
| 4,230,349 | 10/1980 | Normark | 285/382.7 |
| 4,261,599 | 4/1981 | Streed | 285/92 |
| 4,343,496 | 8/1982 | Petranto | |
| 4,568,228 | 2/1986 | Rosan, Jr. | |
| 4,666,190 | 5/1987 | Yamabe et al. | |
| 4,697,828 | 10/1987 | Chou | 285/18 |
| 4,722,560 | 2/1988 | Guest | 285/323 |

FOREIGN PATENT DOCUMENTS

| | | | |
|---|---|---|---|
| 520755 | 3/1931 | Fed. Rep. of Germany | 285/917 |
| 941521 | 4/1956 | Fed. Rep. of Germany | 285/92 |
| 2213901 | 1/1974 | Fed. Rep. of Germany | |
| 3130331 | 5/1982 | Fed. Rep. of Germany | |
| 2172310 | 9/1973 | France | |
| 447502 | 5/1936 | United Kingdom | 285/85 |

OTHER PUBLICATIONS

"Engineering Application Manual AM-19 Inverted MS Boss Seal Fitting Design", *Weatherhead*.

*Primary Examiner*—Dave W. Arola
*Attorney, Agent, or Firm*—Pretty, Schroeder, Brueggemann & Clark

[57] ABSTRACT

A fluid connector fitting nut lock includes a sleeve that fits down over the nut and that has an integral locking mechanism to fix the sleeve in a raised position that allows the nut to be turned and in a locked position that prevents the nut from backing off due to vibration or other external forces. The integral locking mechanism eliminates the need for a separate lockwire or clipwire.

11 Claims, 4 Drawing Sheets

HYDRAULIC FITTING NUT LOCK

CROSS REFERENCE TO RELATED APPLICATIONS

This is a continuation-in-part of application Ser. No. 07/430,317 filed Oct. 31, 1989, which is a continuation-in-part of application Ser. No. 07/032,700 filed Apr. 1, 1987, now U.S. Pat. No. 4,877,271.

BACKGROUND OF THE INVENTION

1. Field of the Invention

This invention relates generally to hydraulic and pneumatic connectors and, more particularly, to connectors in which a coupling nut is fastened to a base element and is locked down so that it cannot back off due to vibration or other external forces.

2. Description of the Related Art

When a fluid-conducting tube is to be connected to an actuator, manifold, or similar hardware, a fitting is threaded into a base element or parent material of the hardware and the end of the tube is pressed over a projecting nozzle of the fitting. The projecting nozzle is axially aligned with the tube, and includes a fluid passageway extending completely through the fitting. Rotational movement of the fitting out of the base element is prevented by a lockring that is first pressed around a mid-portion of the fitting and, after the fitting is threaded into the base, is then pressed into a serrated counterbore in the base. Serrations on the fitting and the lockring prevent the fitting from rotating back out. A leak-proof connection of the tube and projecting nozzle is necessary and is provided by a B-nut, or coupling nut, that is threaded down over the tube end and onto the fitting past the nozzle to provide a seal. A lockwire is used to fix the coupling nut relative to the fitting so the coupling nut does not back off from the fitting due to external forces, such as vibration. The lockwire can be passed through holes formed in the coupling nut and secured to a boss on the base.

The use of a lockwire to fix the coupling nut relative to the fitting is cumbersome, and requires drilling a hole in one or more corners of the coupling nut and providing a boss or tie-down on the base. The lockwire is not a positive mechanical locking device, and installation of lockwires is subject to individual installation techniques, which can be inconsistent and unreliable. Furthermore, under some applications the use of lockwires to lock down the coupling nut is not permitted.

The co-pending parent application referred to above describes an improved hydraulic fitting lock that does away with a separate lockwire, and instead can use a sleeve that slides over the coupling nut between the nut and the base to engage both the coupling nut and the lockring. Axial movement of the sleeve can be prevented by inserting a clipwire through part of the sleeve and beneath the coupling nut so that the bottom of the coupling nut blocks movement of the sleeve. This arrangement, however, still makes use of a separate wire as the locking mechanism, which does not provide a completely consistent and reliable installation. Furthermore, the clipwire lock combination can still run afoul of some regulations that do not permit hydraulic fittings with a separate, removable locking mechanism.

From the foregoing discussion, it should be apparent that there is a need for an easy and reliable method and apparatus for positively locking the coupling nut or other connector of a fluid fitting to a base and providing a leak-free fluid connection without using a separate lockwire or clipwire. The present invention satisfies this need.

SUMMARY OF THE INVENTION

The present invention is embodied in a fluid connector lock combination for connecting a tube to a base element by a coupling nut that is threaded over a projecting nozzle, and includes a sleeve that slides down over the coupling nut and moves between a raised position, which allows the coupling nut to rotate down onto the projecting nozzle to make a leak-proof seal, and a locked position, which prevents the coupling nut from backing off from the projecting nozzle, and further includes an integral locking mechanism to hold the sleeve in one position or the other. In the locked position the sleeve engages a lockring structure that is fixed relative to the projecting nozzle and its base or fitting, and prevents rotational movement between the coupling nut, the sleeve, the nozzle/fitting, and the lockring. The combination of the sleeve and integral locking mechanism fixes the sleeve relative to the coupling nut so the sleeve will not work loose from the locked position due to vibration or other external forces, and will not fall off the coupling nut in the raised position and become lost. The integral locking mechanism eliminates the need for a separate lockwire tied to a boss, and also eliminates the need for a separate clipwire to prevent the coupling nut from backing off. Moving the sleeve to the locked position is a positive motion that is consistently and reliably achieved.

In a preferred form, the lockring structure comprises a lockring set into a base element, with serrations or splines that engage matching serrations on the sleeve when the sleeve is in the locked position. The integral locking mechanism preferably comprises at least two sets of parallel notches cut into the points of the coupling nut, and a circular key or wire held along the inside circumference of the sleeve to alternately engage each set of notches and to hold the sleeve in either the raised position or the locked position. The key, for example, can be a wire bent into an open circle and held near the top inner rim of the sleeve to alternately latch into the sets of notches, which act as detents, as the sleeve is moved axially over the coupling nut. When the sleeve is in the raised position, preferably enough of the coupling nut's flat faces are exposed to allow a wrench or other suitable tool to engage the points of the nut and rotate the nut over the projecting nozzle to the proper torque.

The lockring structure can comprise a serrated cylindrical lockring that is pressed down into a counterbore in a base element or parent material, such as an actuator or manifold. Alternatively, the lockring structure can comprise splines or serrations integrally formed in a base area of a projecting nozzle that is to be coupled to a tube. The integral lockring serrations can be formed in a suitable manner, such as by a machining process, and eliminate the need for a separate lockring piece. In either case, the lockring serrations are fixed relative to the fitting, and can engage matching serrations on the sleeve.

The invention can be used in conjunction with a wide variety of fluid fittings. For example, the invention can be used to securely and reliably couple a tube to a fitting attached to a manifold or actuator, or can be used to couple two fluid-passing tubes end-to-end. The invention can also be used in T-joint or elbow joint tube connectors to couple tubes or hoses in various configurations.

Other features and advantages of the present invention should be apparent from the following description of the preferred embodiments, taken in conjunction with the accompanying drawings, which illustrate, by way of example, the principles of the invention.

DESCRIPTION OF THE PREFERRED EMBODIMENTS

Figure 1:
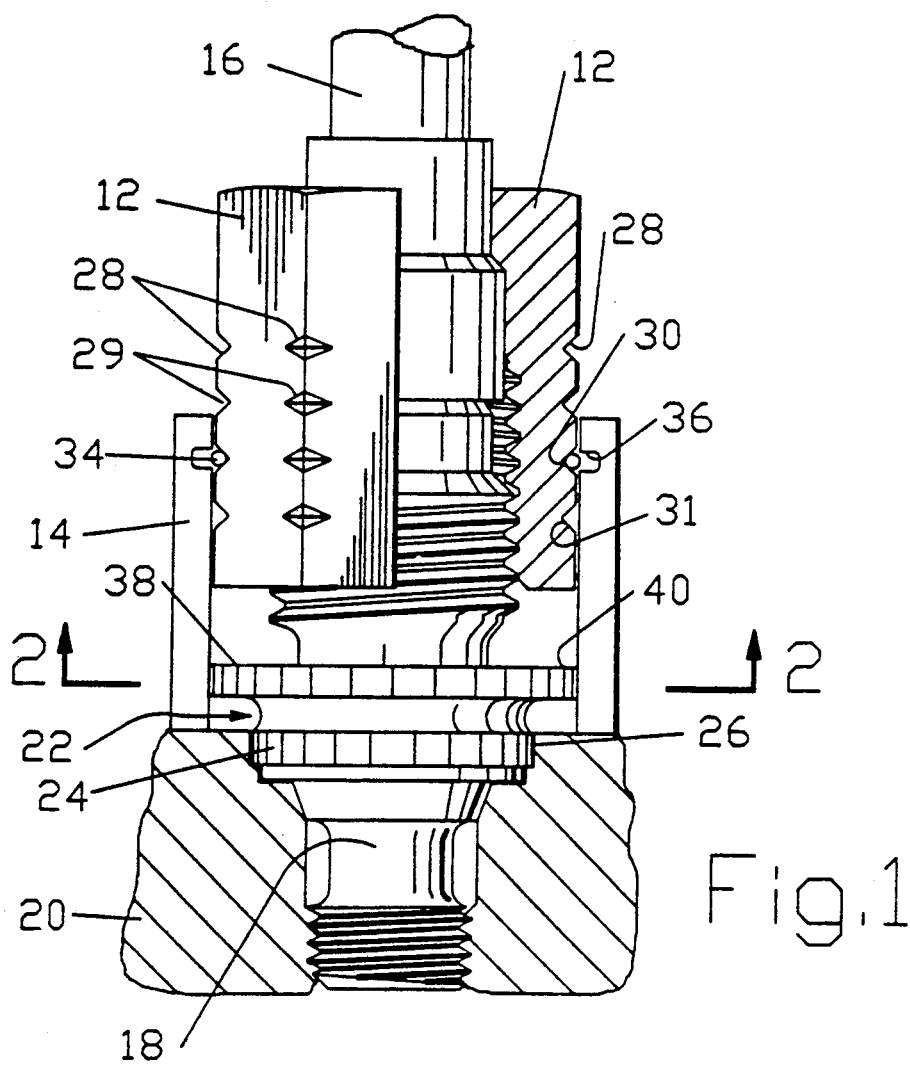
FIG. 1 is a cross-sectional view of a fluid fitting lock combination in accordance with the present invention.

A fluid connector lock combination in accordance with the present invention as illustrated in FIG. 1 includes a hex-head coupling nut 12 and a sleeve 14 that fits around the nut and moves between the raised position and a locked position, and is shown in the locked position in FIG. 1. Moving the sleeve between the raised position and the locked position requires a deliberate, mechanical act and thereby creates a consistent, reliable locking mechanism. The connector lock combination is used to couple a fluid tube or hose 16 to a fitting 18 that is threaded into a base element or parent material 20 of, for example, an actuator or manifold. A lockring 22 includes serrations or splines 24 on a lower part that mate with serrations 26 in the base element. These serrations fix the lockring with respect to the base element.

The left hand side of FIG. 1 shows the exterior portion of the coupling nut 12, and illustrates that the coupling nut is provided with four sets of parallel notches 28, 29, 30, and 31. The sleeve 14 includes a lockring key 34 that can be made, for example, by bending a resilient wire into an open circular shape and placing it into a groove 36 along the inside circumference of a top part of the sleeve. Ordinarily, the wire 34 defines a circle of sufficient diameter to engage the wire in one set of the notches 28, 29, 30, and 31 to hold the sleeve in place. Because, the wire is bent into an open circle and can flex somewhat, it can be made to define a circle of greater diameter than it would at rest. Thus, the sleeve can be moved axially from its locked position shown in FIG. 1 if enough force is applied vertically on the sleeve to lift the lockring key wire 34 out of the notches in which it otherwise rests to ride up along the outside surface of the coupling nut. In this way, the notches act as detents for the key, and keep the sleeve in a relatively fixed position until a deliberate force is applied to move it. The composition of the wire 34, and the shape it is bent into, determine the force necessary to move the wire out of a detent and move the sleeve. Preferably, the force is determined to be well above the external forces, such as vibration, ordinarily, encountered during operation. Thus, the lockring key 34 will not move out of its detent position due to vibration or other external forces, and it and coupling nut notches act as an integral locking mechanism to keep the sleeve in place.

Figure 2:
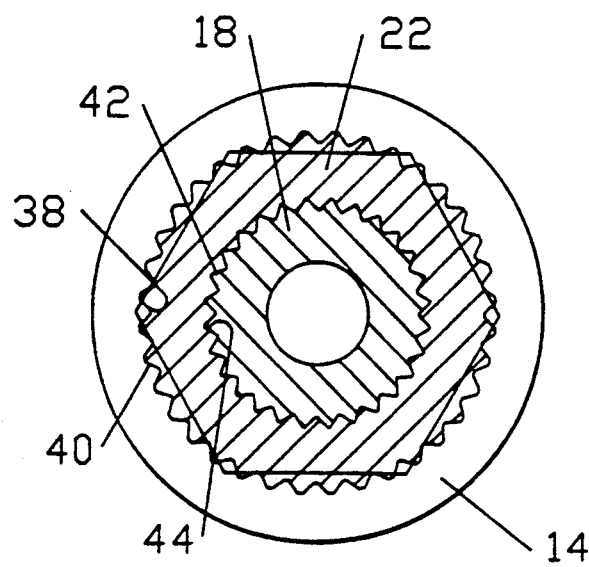
FIG. 2 is a sectional view through line 2—2 of FIG. 1.

The outside top portion of the lockring 22 is provided with serrations 38. The inside lower circumference of the sleeve 14 is provided with serrations 40 that engage the lockring serrations 38 when the sleeve is placed in its locked position. As can best be seen in FIG. 2, the serrations 38 on the lockring 22 engage with the serrations 40 in the sleeve 14, and therefore the sleeve is prevented from moving rotationally relative to the lockring. Because the lockring is fixed with respect to the base element 20, and the fitting 18 is fixed by matching serrations 42 and 44 in the lockring and fitting, respectively, the locked sleeve prevents relative movement between the sleeve, the coupling nut, the fitting, the lockring, and the base element.

Figure 3:
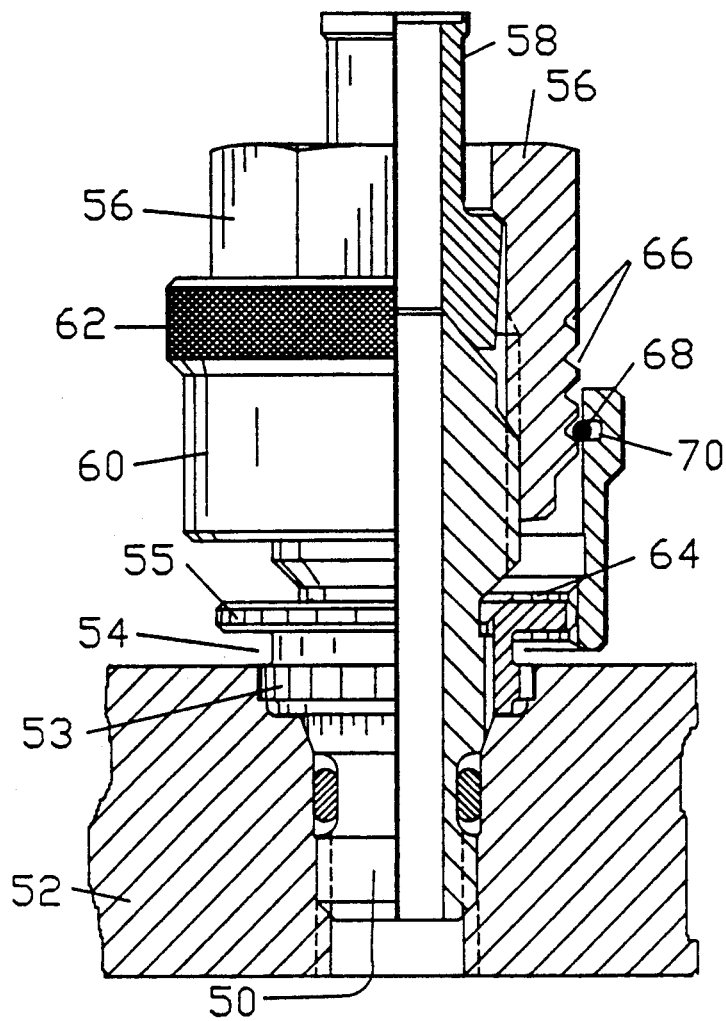
FIG. 3 is a cross-sectional view of a fitting in accordance with the present invention showing the sleeve in a raised position and in a locked position.

FIG. 3 shows a hydraulic fitting/locknut combination in accordance with the present invention, with the left half of the drawing showing an exterior view and the right half showing a cross-sectional view. Once again, a fitting 50 is threaded into a base element 52 and a lockring 54 having outside lower serrations 53 is pressed into a counterbore in the base element, while a hex head coupling nut 56 is threaded over the fitting to create a seal with a hydraulic tube 58. FIG. 3 shows that a sleeve 60 in accordance with the present invention conforms generally to the outside of the coupling nut and includes a knurled outer portion 62 for easier handling. In the raised position shown in the left side of FIG. 3, the sleeve is out of engagement with the lockring 54 and an exposed portion of the coupling nut can be turned by the use of a wrench or other appropriate tool, thereby rotating the coupling nut onto the fitting.

In the locked position shown in cross-section in the right side of FIG. 3, the sleeve 60 is moved downwardly such that serrations 64 along the inside lower circumference of the sleeve engage the upper serrations 55 of the lockring 54. The sleeve is held fixed in position by an integral locking mechanism, comprising a set of notches 66 in the points of the coupling nut hex and a resilient wire 68 set into a groove 70 along the inside upper circumference of the sleeve. The wire can flex somewhat to momentarily define a circle of greater diameter, but ordinarily the wire engages one set of parallel notches 66 in the coupling nut 56. The notches act as detents for the wire, and ensure that the sleeve 60 will not move from its locked position due to external forces and will not come off the coupling nut from the raised position unless forceably removed, thereby decreasing the chance of misplacing the sleeve.

Figure 4:
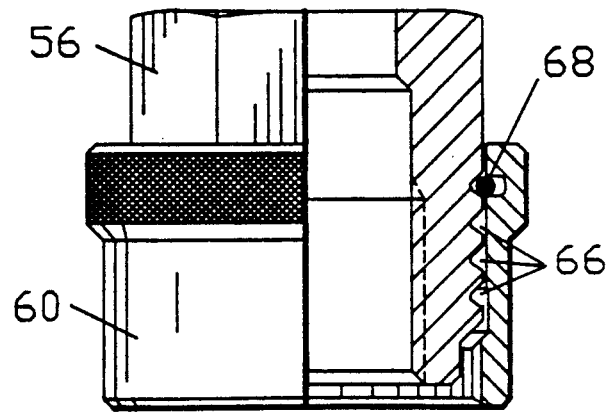
FIG. 4 is a cross-sectional view of the sleeve/coupling nut combination of FIG. 1.

FIG. 4 shows the sleeve 60 and coupling nut 56 from FIG. 3 removed from the fitting 50, with the sleeve in the raised position, the wire 68 being engaged in the top-most set of coupling nut notches 66. FIG. 4 illustrates that, even in raised position, a portion of the coupling nut is exposed, allowing it to be turned by a wrench or other suitable tool, and shows that the sleeve is held in position on the coupling nut by the action of the wire 68 in the coupling nut notches 66.

Figure 5:
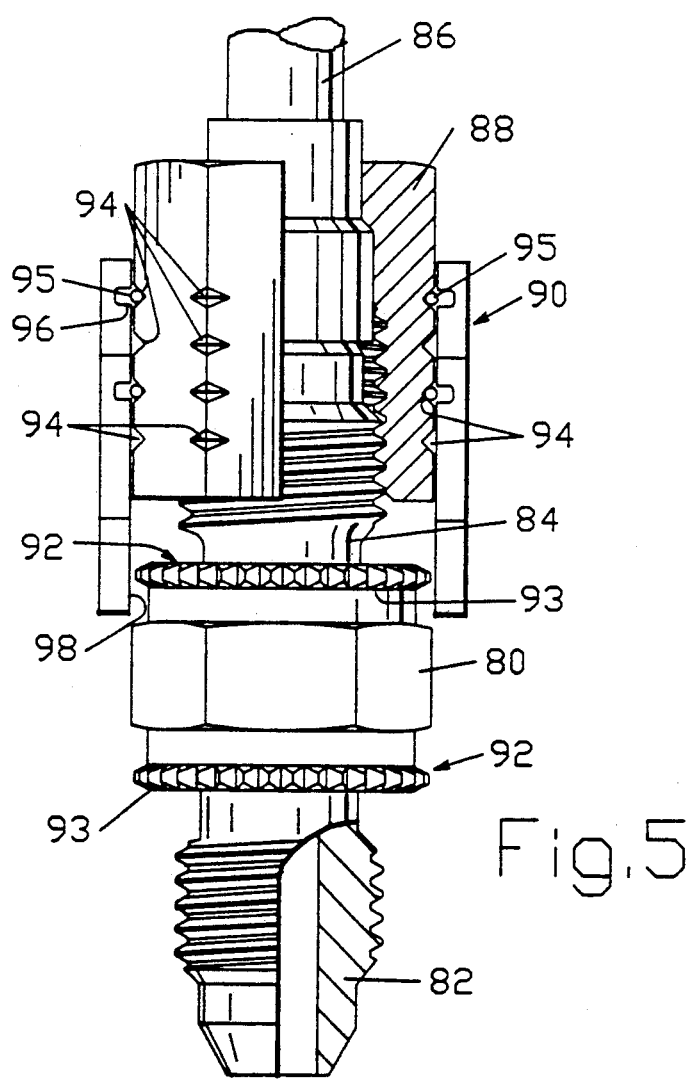
FIG. 5 is a cross-sectional view of a tube-to-tube fitting lock combination in accordance with the present invention.

The present invention can be used in conjunction with a variety of fluid connections. For example, FIG. 5 shows a fitting/lock combination that can join two tubes. It is to be understood that FIG. 5 is a simultaneous representation of a fitting/lock combination in both the raised and locked positions. Those parts corresponding to the raised position and those corresponding to the locked position should be clear from the FIG. 5 drawing and from a review of FIG. 3. A connector 80 includes two opposed fitting projections 82 and 84. A tube 86, such as illustrated at the top of FIG. 5, can be fitted over the end of each projection, although only one tube is shown. A coupling nut 88 can then be threaded down onto each fitting projection 82 and 84, along with a sleeve 90 in accordance with the present invention. In the configuration illustrated in FIG. 5, there is no separate base element with a counterbore into which a lockring is inserted. Instead, a lockring structure 92 with serrations 93 is provided on each fitting projection 82 and 84 by machining or by some other appropriate process.

The sleeve 90 of FIG. 5 is held in its raised and locked positions by an integral lockring key mechanism comprising a set of parallel notches 94 in the coupling nut 88 and a resilient wire 95 held partly in a groove 96 in the inside upper circumference of the sleeve. When in the raised position, the wire 95 of the sleeve is seated in the top-most set of notches 94. When enough force is applied, the wire can momentarily define a circle of greater diameter to slide over the coupling nut until the wire seats again in another set of notches. When the sleeve 90 is moved to its locked position, serrations 98 along the inside lower circumference of the sleeve engage with the serrations 93 on the lockring structure 92. This engagement locks the coupling nuts 88 to the lockring structures, fixing each coupling nut relative to the fitting projections, and ensures that the coupling nuts will not back off of the fitting projections due to vibration or other external forces.

Figure 6:
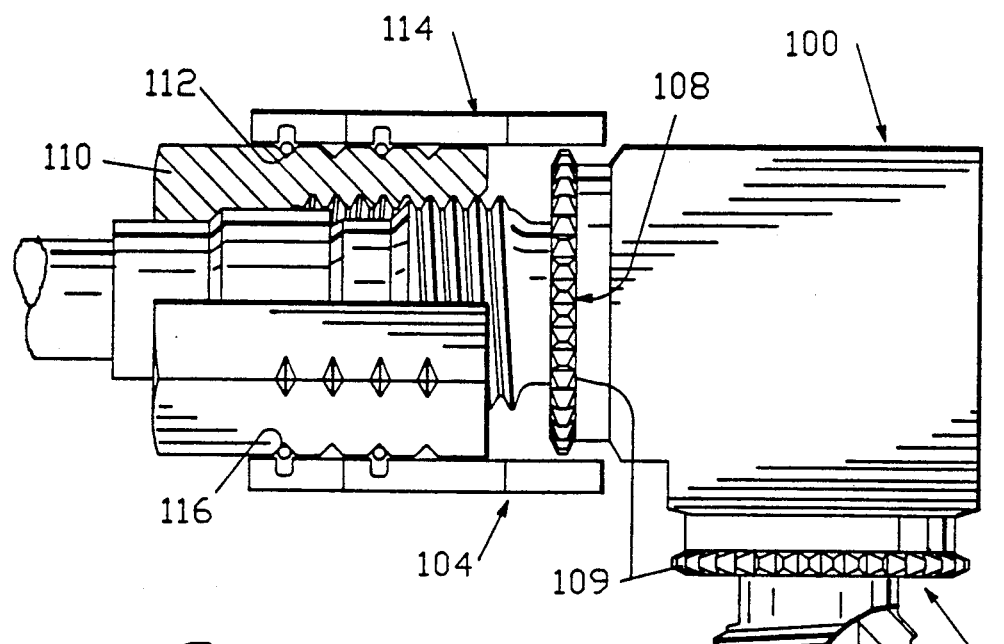
FIG. 6 is a cross-sectional view of an elbow fitting in accordance with the present invention.

Another embodiment of the present invention is illustrated in FIG. 6, which shows a 90° elbow joint fitting 100 used to join two tubes together at an angle to a first fitting projection 102 and a second fitting projection 104. Each fitting projection is provided with a lockring structure 106 and 108, respectfully, that are provided with serrations 109 created by machining or other appropriate processes. Each tube can be attached to each respective fitting projection by a coupling nut 110 (only one of which is illustrated in FIG. 6), which is provided with external notches 112 and a sleeve 114 having an integral lockring key mechanism 116 that engages with the notches to fix the sleeve in place, as described above in connection with FIG. 5.

Figure 7:
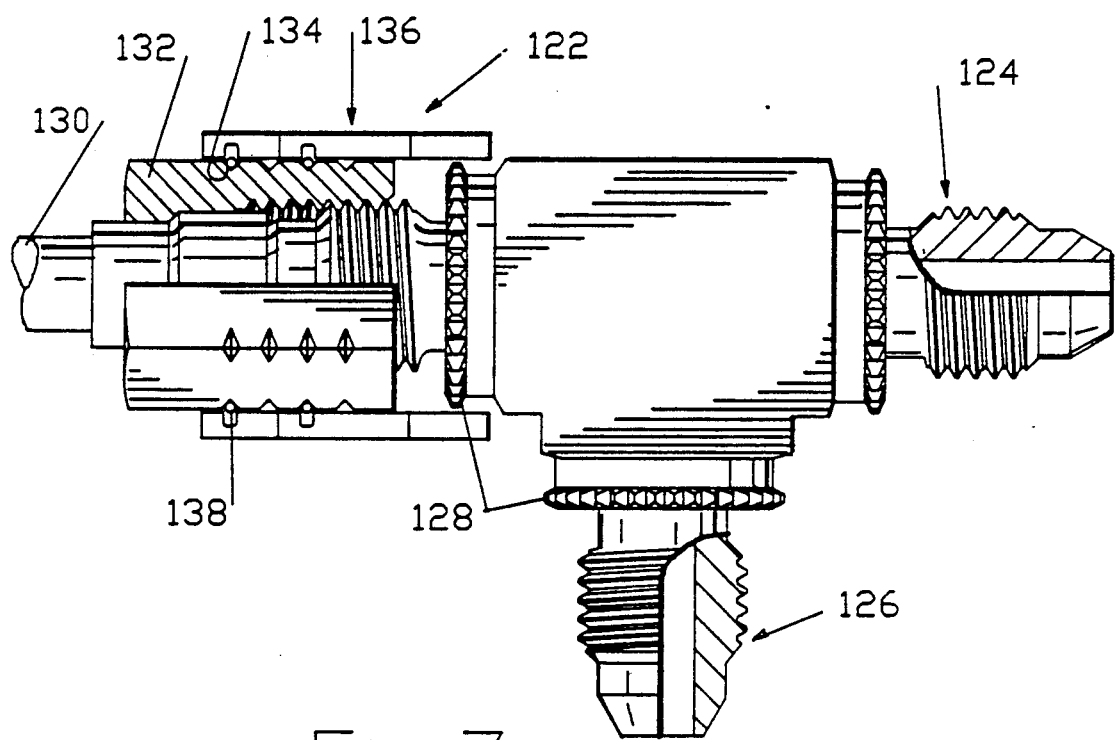
FIG. 7 is a cross-sectional view of a T-fitting in accordance with the present invention.

Finally, FIG. 7 shows yet another embodiment of the present invention applied to a T-joint connector that couples three tubes together. The connector 120 includes three fitting projections 122, 124, and 126, each of which includes a lockring structure 128. As before, a tube can be placed over the end of each fitting projection and attached via a coupling nut 132 having a plurality of notches 134 on its outer face, with a sleeve 136 having an integral lockring key 138 to fix the sleeve in position and lock the coupling nut to the connector.

The present invention has been described above in terms of a presently preferred embodiment so that an understanding of the present invention can be conveyed. There are, however, many configurations for fittings and connectors not specifically described herein, but with which the present invention is applicable. The present invention should therefore not be seen as limited to the particular embodiments described herein, but rather, it should be understood that the present invention has wide applicability with respect to fluid connectors of a wide variety of arrangements and functions. Such alternate configurations can be achieved by those skilled in the art in view of the descriptions herein.

We claim:

1. A fluid connector lock for connecting a tube to a fitting threaded into a base, the lock comprising:
   a lockring having inner serrations on an upper portion that engage matching serrations on the fitting and having splines on a lower portion that engage matching serrations in the base to fix the fitting relative to the base;
   a multiple-faced coupling nut mounting the tube to the fitting through threaded engagement therewith and having at least two sets of parallel notches at the points where its faces meet; and
   sleeve means extending over the coupling nut for preventing unthreading of the coupling nut from the fitting and for placement in a first position in which the sleeve means is held in an upwardly position defined by a first set of the coupling nut notches to allow free movement of the sleeve and a second position defined by a second set of the coupling nut notches in which the sleeve is held in a downwardly position to engage the sleeve with the lockring.

2. A fluid connector lock as recited in claim 1, wherein the coupling nut includes serrations that engage the sleeve means and the lockring includes outer serrations that engage the sleeve means.

3. A fluid connector lock combination for connecting a tube to a base element including at least a first fitting projection that receives one end of the tube and includes a passageway for the passage of fluid, and for maintaining a seal regardless of vibration forces and the like, the combination comprising:
   a lockring structure that includes circumferential serrations disposed along the outside of a lockring structure upper portion;
   fixing means for fixing the lockring structure relative to the fitting projection;
   a coupling nut adapted to be threaded onto the first fitting projection and to urge the tube into engagement with the first fitting projection to provide a seal between the tube and the first fitting projection;
   a movable sleeve that extends axially over the coupling nut and includes serrations along its inside lower circumference; and
   means to prevent relative rotation between said sleeve and said coupling nut and
   integral locking means for holding the sleeve on the coupling nut in a raised position that allows free rotational movement of the coupling nut on the first fitting projection, and for holding the sleeve in a locked position, regardless of the vibration forces, in which the sleeve is held in a downwardly position extending between the coupling nut and the first fitting projection that allows the sleeve serrations to engage the lockring structure serrations and prevent unthreading of the coupling nut from the first fitting projection.

4. A fluid connector lock combination as recited in claim 3, wherein the integral locking means comprises:
   a plurality of sets of circumferential notches disposed along the axis of the coupling nut such that at least two sets define the raised position and locked position of the sleeve, respectively; and key means, forming part of the sleeve, for locating the sleeve in a fixed position at each one of the notches.

5. A fluid connector lock combination as recited in claim 4, wherein the key means comprises:
   a circumferential groove formed along the inside upper circumference of the sleeve; and
   a resilient wire bent into a curved, generally circular shape and placed in the circumferential groove such that it extends partly into a set of the coupling nut notches in a detent action and holds the sleeve in place despite the vibration forces.

6. A fluid connector lock combination as recited in claim 5, wherein the fitting projection is threaded into the base element and the lockring structure comprises a lockring that is separate from the fitting projection and that includes serrations along an outside lower portion such that the lockring can be pressed into a serrated counterbore in the base element to engage base element serrations.

7. A fluid connector lock combination as recited in claim 5, wherein the base element comprises a tube-to-tube connector having opposed ends, including the first fitting projection at one end, and a second fitting projection at the opposite end and the lockring structure comprises serrations that are integrally formed on at least one of the fitting projections.

8. A fluid connector lock combination as recited in claim 5, wherein the base element comprises an elbow joint tube connector including the first fitting projection at one end of the connector and a second fitting projection located at the other end of the connector, and the lockring structure comprises serrations that are integrally formed on at least one of the fitting projections.

9. A fluid connector lock combination for connecting a tube to a base element including at least one fitting projection that receives one end of the tube and includes a passageway for the passage of fluid, and for maintaining a seal regardless of vibration forces and the like, the combination comprising:
   a lockring structure that includes serrations along the outside of a lockring structure upper portion;
   fixing means for fixing the lockring structure relative to the fitting projection;
   a coupling nut adapted to be threaded onto the fitting projection and to urge the tube into engagement with the fitting projection to provide a seal between the tube and the fitting projection;
   a movable sleeve that extends axially over the coupling nut and includes serrations along its inside lower circumference; and
   means to prevent relative rotation between said coupling nut and said sleeve and
   integral locking means for holding the sleeve on the coupling nut in a raised position that allows free rotational movement of the coupling nut on the fitting, and holding the sleeve in a locked position, regardless of the vibration forces, in which the sleeve is held in a downwardly position extending between the coupling nut and the fitting projection that allows the sleeve serrations to engage the lockring structure serrations and prevent unthreading of the coupling nut from the fitting projection, comprising
   a plurality of sets of circumferential notches disposed about the axis of the coupling nut such that at least two sets define the raised position and locked position of the sleeve, respectively, and
   key means, forming part of the sleeve, for locating the sleeve in a fixed position at each one of the notches, comprising
      a circumferential groove formed along the inside upper circumference of the sleeve, and
      a resilient wire bent into a curved, circular shape and placed in the circumferential groove such that the wire is ordinarily held in the groove such that it extends partly into a set of the coupling nut notches in a detent action and holds the sleeve in place despite the vibration forces.

10. A fluid connector lock combination as recited in claim 9, wherein the fitting projection is threaded into the base element and the lockring structure comprises a lockring that is separate from the fitting projection and that includes serrations along an outside lower portion such that the lockring can be pressed into a serrated counterbore in the base element to engage base element serrations.

11. A method of providing a leak-free connection between a tube and a fitting projection, regardless of vibration forces, comprising:
   attaching a tube to the fitting projection;
   providing a lockring structure that is fixed relative to the fitting projection and that includes axial serrations along the outside of a lockring structure upper portion;
   providing a coupling nut, adapted to be threaded onto the fitting projection and to engage the tube and urge the tube into engagement with the fitting projection to provide a seal between the tube and the fitting projection, with a plurality of sets of circumferential notches disposed about the axis of the coupling nut;
   providing a movable sleeve that extends axially over the coupling nut with means therebetween to prevent relative rotation between said coupling nut and said sleeve and includes axial serrations along its inside lower circumference, and that further includes a circumferential groove formed along the inside upper circumference of the sleeve, and a resilient wire bent into a curved, semi-circular shape and placed in the circumferential groove such that the wire is ordinarily held in the groove such that it extends partly into a set of the coupling nut notches in a detent action to define a raised position and locked position of the sleeve and holds the sleeve in position despite the vibration forces;
   placing the sleeve in the raised position;
   rotating the coupling nut onto the fitting projection to a predetermined torque; and
   placing the sleeve in the locked position whereby the serrations in the sleeve engage the serrations on the lockring.

* * * * *